July 26, 1932.    O. F. DRENNAN    1,868,731
PLANTER
Filed Aug. 10, 1931
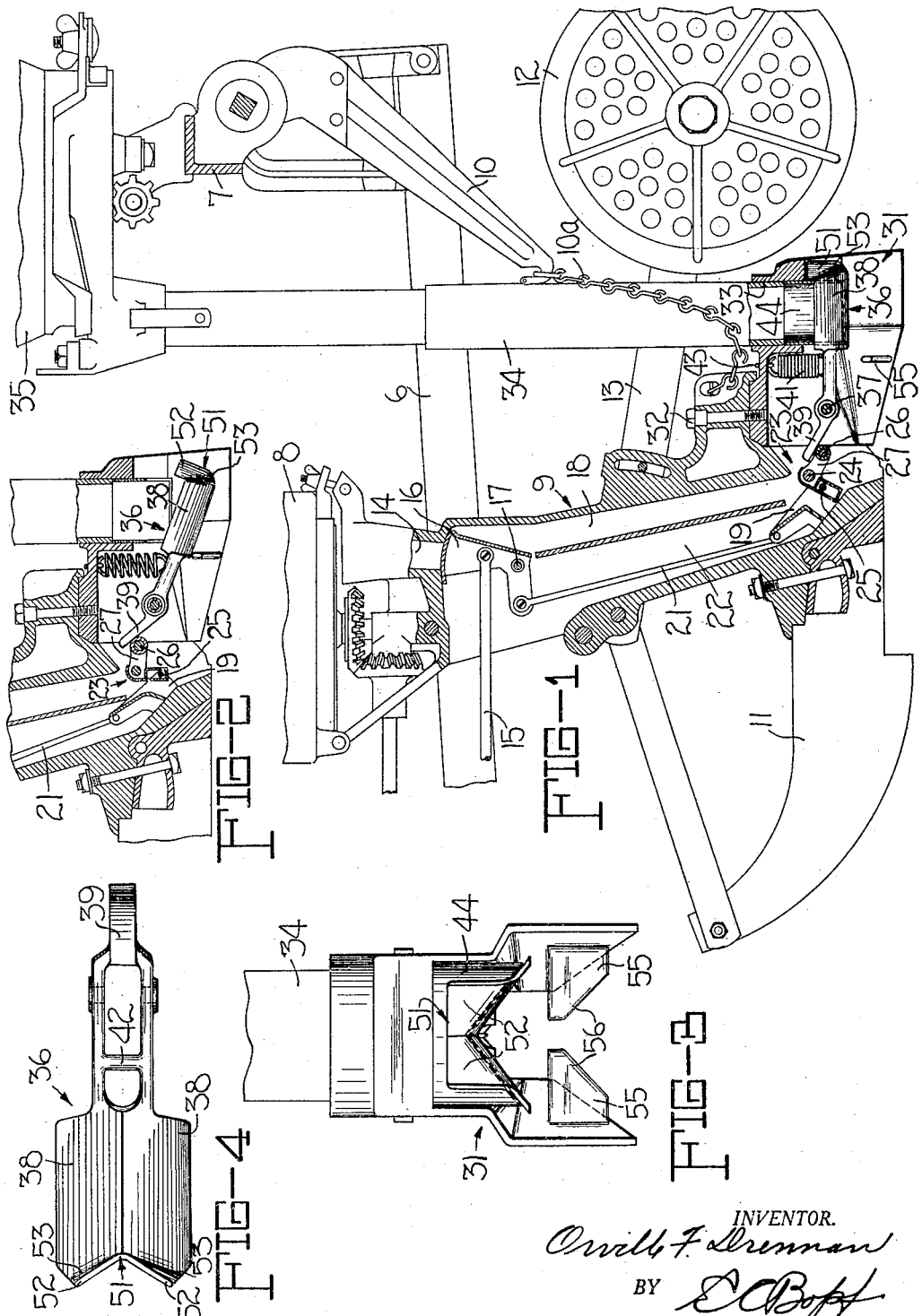
INVENTOR.
Orville F. Drennan
BY
ATTORNEY.
WITNESS.
Edward Melin.

Patented July 26, 1932

1,868,731

UNITED STATES PATENT OFFICE

ORVILLE F. DRENNAN, OF MOLINE, ILLINOIS, ASSIGNOR TO DEERE & COMPANY, OF MOLINE, ILLINOIS, A CORPORATION OF ILLINOIS

PLANTER

Application filed August 10, 1931. Serial No. 556,045.

My invention relates to fertilizer distributors and particularly to the type which are adapted to be attached to agricultural implements such as planters.

The main object of my invention is to provide a new and improved valve construction for a fertilizer distributor.

Another object of my invention is to provide a shield for deflecting clods and other foreign matter away from the valve so that the valve may open a sufficient distance to function properly.

My invention is in the nature of an improvement upon the mechanism disclosed in the co-pending application of Charles H. White, Serial Number 439,567, filed March 28, 1930, for planters. The fertilizer distributor disclosed in this application shows a combination valve and wedge-shaped fertilizer distributor. In the operation of the fertilizer distributor the fertilizer is deposited at intervals simultaneously with the planting of the seed. The fertilizer valve is automatically opened simultaneously with the seed gate of the planter. The major portion of the fertilizer is guided down the wedge-shaped sides of the valve and is deposited in two concentrated bands at each side of the seed and a small portion falls off the rear end of the valve above the seed. When the fertilizer is deposited in this manner a thin layer of soil is placed between the seed and the fertilizer but under certain soil conditions this is not sufficient to properly separate them. The fertilizer is therefore apt to come in direct contact with the seed which results in what is commonly known as "firing" of the seed. In my improved valve construction I have provided a fender at the rear end of the valve which prevents the spilling of any fertilizer off the end thereof and thus causes all the fertilizer to be deposited in two bands flanking the seed hill at each side thereof, and prevents any fertilizer being deposited directly over the seed.

The fender at the rear of the valve comprises a pair of forwardly converging walls formed integrally with the laterally sloping portions of the wedge-shaped valve. The angle between these walls is such that the meeting lines between the walls of the fender and the laterally sloping portions of the wedge-shaped valve lie in a transverse vertical plane when the valve is open. By reason of this construction the fertilizer does not have a tendency to accumulate at this point and is discharged over the shortest possible path over the valve to the ground and consequently in the shortest space upon the ground.

A further novel feature of my invention resides in the addition of a pair of shields arranged in advance of the fertilizer valve and serving to deflect clods and other foreign matter away from the region of the valve and thereby provide sufficient clearance for the proper action of the valve.

Other objects and advantages of my invention will be apparent to those skilled in the art after a consideration of the following detailed description, taken in conjunction with the accompanying drawing wherein:

Fig. 1 is a fragmentary sectional view showing parts of a checkrow planter, and portions of the fertilizer attachment in sectional detail with the fertilizer valve in closed position;

Fig. 2 is a fragmentary sectional detail view showing the lower portion of the seed dropping mechanism and fertilizer distributing attachment with the fertilizer valve in open position;

Fig. 3 is a rear elevational view of the fertilizer distributing attachment; and, Fig. 4 is an enlarged plan view of the fertilizer valve showing my improved fender attached to the rear end thereof.

The general construction of this type of planter is old and well known in the art and I have therefore not deemed it necessary to illustrate the entire mechanism. Furthermore, the above noted co-pending application clearly illustrated and describes a type of fertilizer distributor which substantially approximates the distributor to which I have applied my improvements.

Referring to Fig. 1 of the drawing, the numeral 6 illustrates a portion of one of the longitudinal frame bars of the planter frame and 7 a transverse angle bar located adjacent the rear end of the bars 6. The planting mechanism comprises a seed hopper 8 and runner shank 9 mounted in floating relation to the main frame. The planting mechanism may be raised for transport by means of the lifting arm 10 and the chain 10a as illustrated in the drawing. The runner or furrow opener 11 is attached to the runner shank and extends forward therefrom and the supporting or covering wheels 12 are mounted on an arm 13 adjustably connected to the runner shank 9 and extending rearwardly therefrom.

As is customary in devices of this type, a seed selecting mechanism is provided in the bottom of the seed hopper 8 and is adapted to drop a predetermined number of seeds into a seed chamber 14 according to the actuation of a seed feeding plate forming a part of the seed selecting device, but as these parts have nothing to do with the present invention they have not been illustrated.

In the operation of a check row planter a check head (not shown) mounted on the front end of the frame is actuated intermittently by equidistantly spaced buttons on a check-wire which is stretched across the field. A rod 15 is operatively connected to the check head and to an upper valve member 16 pivoted at 17 to the runner shank, a pull on the rod 15 opening the valve 16 and the return thereof closing same as will be readily understood.

The upper valve member 16 is normally in position to close the opening in the lower end of the seed chamber 14, but when rocked by a pull of the rod 15 it is adapted to clear the opening and allow the accumulation of seeds therein to fall by gravity down a passage 18 formed in the runner shank 9 where the seeds are received by a lower valve member 19 by the operation of which they are subsequently discharged through an opening in the lower end of the runner shank and into the furrow. The valve 19 is actuated simultaneously with the valve 16 by means of a connecting rod 21 which is pivotally connected to both valves and is located in a passage 22 in the runner shank 9.

A seed gate 23 is pivotally mounted at 24 in the lower end of the seed shank 9 and is provided with a slot adapted to receive a pin 25 carried by the side walls of the valve 19. A roller 26 is provided between the arms 27 which extend rearward from the seed gate 23, said roller being in constant contact with a fertilizer distributing mechanism to be described later.

The mechanism thus far described has been described in detail in the co-pending application of Charles H. White, Serial Number 439,567, filed March 28, 1930, and since this part of the mechanism does not relate to the invention it is considered that this description will suffice.

The fertilizer attachment comprises a valve boot 31 which is secured to the runner shank 9 by means of a bolt 32. An opening 33 is provided in the upper side of the valve boot 31 and is adapted to receive the lower end of a fertilizer conductor tube 34 extending downwardly from a fertilizer hopper 35 which is mounted on the transverse angle-bar 7. A fertilizer valve 36 is pivotally mounted on a pivot pin 37 extending between the opposite side walls of the valve boot 31. The valve 36 includes a rearwardly extending wedge-shaped portion in the form of an inverted V comprising downwardly and outwardly converging portions 38, and a forwardly extending finger or actuating member 39 which extends over the roller 26, above described, and is in constant contact therewith.

One end of a spring 41 engages a cross bar 42 in the valve 36 and a cotter 43 on the opposite end of the spring extends through a hole in the upper side of the valve boot 31. The spring 41 tends to maintain the valve 36 in its closed position as is readily apparent.

A short rectangular sleeve 44 is fitted into the lower end of the opening 33 in the valve boot 31 which opening is correspondingly rectangularly shaped to receive the sleeve. This sleeve extends down a short distance into an enlarged or open portion of the boot 31. The lower end of the sleeve 44 is notched on the front and rear walls in such a manner as to correspond with the pitch of the two sides 38 of the wedge-shaped portion of the valve 36, as shown in Fig. 3. The notch in the lower end of the sleeve forms a seat or contacting surface for the converging portions 38 when said valve is in closed position.

As previously stated the valve 36 is normally held in contact with the notched seat in the sleeve 44 by means of the spring 41. The fertilizer accumulates upon the sloping surfaces of the rearwardly extending portion 38 of the valve and is discharged by the action of the seed valve 19 by means of the roller 26 contacting with the finger 39.

In the above noted co-pending application of Charles H. White a similar valve is used and mounted in the same manner. It has been found in practice that when the valve is opened some of the fertilizer drops off the rear end thereof because of the valve tipping downward, and this fertilizer is scattered over the top of the seed. To prevent this action I employ a deflector plate or fender 51 at the rear end of the valve and by means of which the fertilizer is prevented from dropping off the end thereof. The fender 51 is arranged at substantially right angles to the portions 38 and is formed integrally therewith and comprises a pair of members 52 which diverge rearwardly from the medial line of the sloping portion 38 and are of sufficient height to prevent the discharge of fertilizer off the end of the valve.

The fender portions 52 are positioned at such an angle relative to each other and the angle between the side of the valve that the meeting lines 53 of these portions with the sides 38 of the valve are in a transverse vertical plane when the valve is open to discharge the fertilizer, as shown in Fig. 2. By reason of this construction the fertilizer, in being discharged may slide off the valve with a minimum of friction and in the shortest path to the ground. It will be readily apparent that if this meeting line were on a plane inclining forwardly of the vertical plane the fertilizer would have to slide forwardly and downwardly on the sloping portions 38 and travel in a longer path of gentler slope, which would delay the discharge of the fertilizer causing it to be deposited in a longer band.

A shield 55 is formed integral with each side of the valve boot 31 and extends inwardly therefrom to a point adjacent the center line of the boot. The shields are arranged so as to aline with each other and are located slightly forward of the sleeve 44 and adjacent the lower edge of the boot sides. The lower inner corner of each shield is cut away at 56. The shields 55 serve to deflect or break clods of dirt which would otherwise accumulate below the valve and interfere with the proper function thereof.

In the operation of my improved fertilizer distributor the seed is conducted through the passage in the runner shank and is discharged by the lower valve in the usual way. Simultaneously with the actuation of the lower seed valve and by reason of its contact with the actuating finger 39 the fertilizer valve is also opened, whereupon the charge of fertilizer that has accumulated in the lower end of the tube 34 is discharged upon the ground. The fender at the rear end of the valve deflects the fertilizer down the sloping bottom portions of the valve, causing it to be deposited at each side of the seed just planted. As previously described, the valleys which are present at the meeting lines of the diverging fender portions and the sloping valve portions are in a transverse vertical plane when the valve is open so that the fertilizer may slide downward off the valve in the shortest possible path. This construction also prevents the fertilizer from accumulating or sticking in the valley as might otherwise result if the valley or meeting line were inclined forwardly of the vertical plane.

As the implement advances, the shields 55 which extend inwardly from the sides of the valve boot engage the soil in such a manner as to clear a path in which the valve may operate. The shields also tend to cover the seed so that the fertilizer which is deposited at each side thereof cannot roll inwardly and come in contact therewith.

While I have described, in connection with the accompanying drawing, the specific form in which I prefer to embody my invention, it is to be understood that the invention is not to be limited to the specific means which I have herein shown and described and that, in fact, widely different means may be employed in the practice of the broader aspects of my invention.

What I claim, therefore, and desire to secure by Letters Patent is:

1. In a fertilizer distributor comprising a valve boot, a valve pivotally mounted in said boot, and an upwardly turned fender at the rear end of the valve to prevent fertilizer being discharged from the end thereof.

2. In a fertilizer distributor comprising a valve boot, a valve seat in the lower end thereof, a valve pivotally mounted in the boot and adapted to engage the valve seat, and a fender positioned on the valve to prevent fertilizer being discharged from the end thereof.

3. In a fertilizer distributor comprising a valve boot, a sleeve mounted in said boot and having a valve seat in the lower end thereof, a valve pivotally mounted in the boot and adapted to engage the valve seat, and a fender comprising rearwardly diverging portions positioned on the valve to prevent fertilizer being discharged from the end thereof.

4. In a fertilizer distributor comprising a valve boot, a sleeve mounted in said boot and having a valve seat in the lower end thereof, a valve comprising two longitudinally disposed laterally inclined portions diverging from the longitudinal medial line thereof and having two upwardly turned fenders at the rear end diverging rearwardly and positioned at such an angle that the meeting lines between the fenders and the laterally inclined portions lie in a transverse vertical plane when the valve is open.

5. In a fertilizer distributor comprising a valve boot open at its front, rear and bottom sides, a sleeve mounted in the top of the boot and extending inwardly therefrom and having a valve seat in the lower end thereof, a valve pivotally mounted in the boot and adapted to engage the valve seat, and a shield extending inwardly from each side of the boot and located forwardly of the valve and adjacent the lower edge of the boot sides and adapted to deflect clods and other foreign matter away from the valve.

6. In a fertilizer distributor comprising a boot, a fertilizer conductor tube leading into said boot, a member disposed in said boot to receive fertilizer from the end of said boot, said member comprising two longitudinally disposed laterally inclined portions diverging from the longitudinal median line thereof for dividing the fertlizer received from said conductor tube into two streams and directing them on opposite sides of the boot, and having an upwardly turned fender at its rear end to prevent fertilizer being discharged over the rear end thereof.

7. In a fertilizer distributor comprising a boot, a member disposed in said boot to receive fertilizer from the end of said boot, said member comprising two longitudinally disposed laterally inclined portions diverging from the longitudinal median line thereof for dividing the fertilizer received from said conductor tube into two streams and directing them to opposite sides of the boot and having two upwardly turned fenders at the rear end diverging rearwardly to prevent fertilizer being discharged over the rear end thereof, said member being held in a fertilizer distributing position in a downwardly and rearwardly inclined position at such an angle that the meeting lines between the fenders and the laterally inclined portions lie in a transverse vertical plane.

ORVILLE F. DRENNAN.